United States Patent
Murai et al.

(10) Patent No.: US 9,359,536 B2
(45) Date of Patent: Jun. 7, 2016

(54) AQUEOUS ADHESIVE AGENT COMPOSITION

(75) Inventors: Takefumi Murai, Takatsuki (JP); Yoshimi Shibata, Takatsuki (JP)

(73) Assignee: Sunstar Giken Kabushiki Kaisha, Osaka (JP)

( * ) Notice: Subject to any disclaimer, the term of this patent is extended or adjusted under 35 U.S.C. 154(b) by 47 days.

(21) Appl. No.: 13/377,928

(22) PCT Filed: Jun. 16, 2010

(86) PCT No.: PCT/JP2010/060166
§ 371 (c)(1), (2), (4) Date: Dec. 13, 2011

(87) PCT Pub. No.: WO2010/147130
PCT Pub. Date: Dec. 23, 2010

(65) Prior Publication Data
US 2012/0095130 A1   Apr. 19, 2012

(30) Foreign Application Priority Data
Jun. 18, 2009  (JP) .................................. 2009-145078

(51) Int. Cl.
| C09J 133/02 | (2006.01) |
| C09J 123/26 | (2006.01) |
| C09J 11/06 | (2006.01) |
| C09J 11/08 | (2006.01) |
| C09J 133/00 | (2006.01) |
| C09J 163/00 | (2006.01) |
| C09J 133/06 | (2006.01) |
| C08L 23/26 | (2006.01) |

(52) U.S. Cl.
CPC ............. *C09J 133/06* (2013.01); *C09J 133/02* (2013.01); *C08L 23/26* (2013.01)

(58) Field of Classification Search
CPC ...................................................... C08G 59/188
USPC ........... 523/201, 402, 406, 408; 525/301, 902
See application file for complete search history.

(56) References Cited

U.S. PATENT DOCUMENTS

| 4,552,811 A * | 11/1985 | Brown et al. ............ 428/402.21 |
| 5,030,666 A * | 7/1991 | Kowalski et al. .............. 523/201 |
| 5,229,447 A * | 7/1993 | Miyajima et al. .............. 524/377 |
| 5,574,117 A * | 11/1996 | Yoshida et al. .......... C08F 20/06 526/222 |
| 2007/0021533 A1 * | 1/2007 | Yan et al. ....................... 523/200 |
| 2010/0065209 A1 * | 3/2010 | Burghardt et al. ............. 156/326 |

FOREIGN PATENT DOCUMENTS

| JP | 05-311140 | 11/1993 |
| JP | 2000-198940 | 7/2000 |
| JP | 2003-272440 | 9/2003 |
| JP | 2008-260903 | 10/2008 |
| WO | WO 2008077766 A1 * | 7/2008 ............. C08G 18/79 |

OTHER PUBLICATIONS

Scifinder aziridine properties data sheets (2014).*
Scifinder properties of melamine (2015).*

* cited by examiner

*Primary Examiner* — Mark Kaucher
*Assistant Examiner* — Kregg Brooks
(74) *Attorney, Agent, or Firm* — Jacobson Holman PLLC

(57) ABSTRACT

Disclosed is an aqueous adhesive agent composition which has no concern about environmental safety and can be used as an adhesive agent composition for automobile interior materials. The aqueous adhesive agent composition comprises (A) an acid-modified polyolefin resin and (B) a core-shell-type curing agent.

5 Claims, No Drawings

AQUEOUS ADHESIVE AGENT COMPOSITION

FIELD OF THE INVENTION

The present application is a national stage of PCT/JP2010/060166 filed Jun. 16, 2010 and published in Japanese, which claims the Paris Convention priority based on Japanese Patent Application No. 2009-145078 filed on Jun. 18, 2009, the entire content of which is incorporated herein by reference.

The present invention relates to an aqueous adhesive composition. In particular, the present invention relates to a one-pack thermosetting aqueous adhesive composition which can be used as an adhesive composition for an automobile interior part.

BACKGROUND ART

An automobile interior part such as a roof lining, a door trim, an instrument panel, a dash silencer, a center console, a pillar, an ornament, a rear parcel and a seat is generally produced by bonding a cover material made of a polyolefin, a polyurethane foam or a decorating material such as a fabric attached with a polyurethane foam to a molded article made of a polyolefin such as a polypropylene and a polyethylene with an adhesive by means of a pressure-bonding and molding process, a vacuum-molding process, or the like. In the past, a polychloroprene-based adhesive which is applied by spraying has been used for the adhesion. It is desired, however, to replace the polychloroprene-based adhesive with an adhesive containing no halogen, from the viewpoint of environmental safety.

As a substituent of a polychloroprene-based adhesive, an adhesive composition containing a polyolefin resin modified with an unsaturated carboxylic acid and/or a derivative thereof as a base polymer is developed (see, for example, Patent Documents 1 and 2). However, a further adhesion to a polyolefin and a heat resistance are needed for the polyolefin-based adhesive composition. In addition, an adhesive which does not emit a solvent gas when applying or drying is needed from the viewpoint of environment safety.

Patent Document 1: JP-A-2000-198940
Patent Document 2: JP-A-2008-260903

SUMMARY OF THE INVENTION

An object of the present invention is to provide a one-pack thermosetting adhesive aqueous composition which does not emit a solvent gas when applying or drying and can be used as an adhesive composition for an automobile interior part, in particular, as an adhesive composition for precoating in a vacuum-molding process for an automobile interior part made of a polyolefin and is excellent in storage stability of a composition before applying, storage stability after forming a coating, adherence to a polyolefin and heat resistance.

The present inventors have made intensive studies in order to solve the above-mentioned object. As a result, they have found that the object can be achieved by an aqueous adhesive composition comprising (A) an acid-modified polyolefin-based resin and (B) a core-shell hardener, and thus the present invention has been accomplished.

The present invention is intended to provide the following embodiments.

[1] An aqueous adhesive composition, comprising
(A) an acid-modified polyolefin-based resin, and
(B) a core-shell hardener.

[2] The aqueous adhesive composition according to [1], wherein a core of the core-shell hardener (B) comprises a compound which is capable of cross-linking to the acid-modified polyolefin-based resin (A).

[3] The aqueous adhesive composition according to [2], wherein the compound which is capable of cross-linking to the acid-modified polyolefin-based resin (A) comprises an epoxy-containing resin or a monomer thereof.

[4] The aqueous adhesive composition according to any one of [1]-[3], wherein a shell of the core-shell hardener (B) comprises an acrylic copolymer.

[5] The aqueous adhesive composition according to [4], wherein the acrylic copolymer has a glass transition temperature of −30° C. or higher.

[6] The aqueous adhesive composition according to any one of [1]-[5], wherein a weight ratio of the core and the shell in the core-shell hardener (B) is from 10:90 to 90:10.

[7] The aqueous adhesive composition according to any one of [1]-[6], wherein the aqueous adhesive composition further comprises an amine-based hardener (C).

[8] The aqueous adhesive composition according to [7], wherein the amine-based hardener (C) has a melting point of 60° C. or higher.

[9] The aqueous adhesive composition according to any one of [1]-[8], for an automobile interior part.

[10] The aqueous adhesive composition according to any one of [1]-[9], for a precoat adhesive.

EFFECTS OF THE INVENTION

The aqueous adhesive according to the invention is a one-pack thermosetting aqueous adhesive composition which does not have any problem in environment safety and is particularly excellent in storage stability of the composition before applying, storage stability after forming a coating, adherence to a polyolefin and heat resistance. Accordingly, the aqueous adhesive according to the invention can be preferably used as an adhesive composition for an automobile interior part such as a roof lining, a door trim, an instrument panel, a dash silencer, a center console, a pillar, an ornament, a rear parcel and a seat, in particular, as an adhesive composition for precoating in a vacuum-molding process for an automobile interior part made of a polyolefin.

EMBODIMENTS OF THE INVENTION

The aqueous adhesive according to the invention comprises an acid-modified polyolefin-based resin (A) as a base polymer.

The examples of the acid-modified polyolefin-based resin (A) in the invention include a polypropylene (PP) which is modified by introducing an unsaturated dibasic acid such as a maleic acid, a fumaric acid, a citraconic acid and a mesaconic acid or an anhydride thereof, a propylene-butene copolymer (PB), a propylene-butene-ethylene copolymer (PBE), a styrene-ethylene/butene-styrene copolymer (SEBS), an ethylene-vinyl acetate copolymer (EVA), an ethylene-acrylate copolymer (EEA). They are known per se and commercially available.

An acid modification amount of the above-mentioned acid-modified polyolefin-based resin (A) is, for example, 1.0 to 5.0 wt. %, preferably from 1.0 to 10 wt. %, more preferably from 1.0 to 5.0 wt. % based on the weight of the polyolefin-based resin, although it is not particularly limited. When the acid modification amount is less than 1.0 wt. %, the stability of emulsion may be impaired. When the acid modification amount is more than 50 wt. %, the adhesion to an adherend made of a polyolefin may significantly decrease.

The term "acid modification amount" in this context means a value determined depending on the blending amount upon polymerization.

A content (solid content) of the above-mentioned acid-modified polyolefin-based resin (A) in the aqueous adhesive composition according to the invention is, for example, preferably 5 to 70 wt. %, more preferably from 10 to 50 wt. % based on the whole amount of the aqueous adhesive composition, although it is not particularly limited. When the content of the above-mentioned acid-modified polyolefin-based resin (A) is less than 5 wt. %, the adhesion to an adherend made of a polyolefin may decrease. When the content of the above-mentioned acid-modified polyolefin-based resin (A) is more than 70 wt. %, an adhesion failure may occur when the adhesive is laminated at a lower temperature.

A melting point of the above-mentioned acid-modified polyolefin-based resin (A) is preferably 150° C. or lower, more preferably 130° C. or lower, from the viewpoint of adhesion, although it is not particularly limited.

The aqueous adhesive according to the invention comprises a core-shell hardener (B) in addition to the above-mentioned acid-modified polyolefin-based resin (A).

The "core-shell hardener" in the invention means a hardener which has different compositions between the central part of an emulsion particle, the core part, and the outer envelope part of an emulsion particle, the shell part, and contains a composition associated with cross-linking in the core part.

The core of the above-mentioned core-shell hardener (B) is not particularly limited. The examples of the core include a compound which is capable of cross-linking to the acid-modified polyolefin resin (A) such as an epoxy group-containing resin or a monomer thereof (for example, a reaction product of bisphenol A and epichlorohydrin or a mixture of bisphenol A and epichlorohydrin), an amine compound (for example, ethylenediamine, diethylene triamine, triethylenetetraamine, isoholondiamine, diaminodiphenylmethane, diaminodiphenylsulfone, polyamides, dicyandiamide, tertiary amines, imidazoles). Among them, an epoxy group-containing resin or a monomer thereof is preferred from viewpoint of reactivity and the stability of a core-shell emulsion.

The shell of the above-mentioned core-shell hardener (B) is not particularly limited. The examples of the shell include an acrylic copolymer (for example, a polymer or a copolymer of methyl(meth)acrylate, butyl(meth)acrylate, 2-ethyl hexyl (meth)acrylate, glycidyl(meth)acrylate) and a polyurethane resin copolymer. Among them, an acrylic copolymer is preferred.

As the above-mentioned acrylic copolymer, an acrylic copolymer having a glass transition temperature of −30° C. or higher, preferably −15° C. or higher is preferred. When the glass transition temperature is lower than −30° C., the storage stability of the adhesive composition may decrease. The upper limit of the glass transition temperature of the acrylic copolymer is preferably 100° C. or lower, more preferably 80° C. or lower, so that the lower limit of the temperature at which an adhesive is heated before bonding becomes higher, although it is not particularly limited.

The weight ratio of the core and the shell in the above-mentioned core-shell hardener (B) is, preferably from 10:90 to 90:10, more preferably from 35:65 to 60:40, from the viewpoint of the stability of the core part which is internally contained, although it is not particularly limited.

The above-mentioned core-shell hardener (B) can be prepared, for example, in an emulsion polymerization by dispersing the core part to a solvent and dropping the shell part to there.

In addition, the above-mentioned core-shell hardener (B) is commercially available, for example, as Polytron R-100 from ASAHI KASEI Corporation.

A content (solid content) of the above-mentioned core-shell hardener (B) in the aqueous adhesive composition according to the invention is, for example, preferably 0.5 to 20 wt. %, more preferably from 1 to 10 wt. % based on the whole amount of the adhesive composition, although it is not limited. When the content of the core-shell hardener is less than 0.5 wt. %, the heat resistance of the adhesive which is intended may be insufficient: When the content of the core-shell hardener is more than 20 wt. %, the stability after forming an adhesive coating may be impaired.

The aqueous adhesive composition according to the invention may optionally comprise an amine-based hardener (C). The amine-based hardener (C) is not particularly limited. The examples of the amine-based hardener (C) include a polyamine compound which can be categorized into the groups (I) and (II) as follows:

(I) A solid polyamine compound having a melting point of 60° C. or higher, preferably from 80 to 200° C. The Examples of the solid polyamine compound include an aromatic polyamine such as 4,4'-diaminodiphenylmethane, 2,4'-diaminodiphenylmethane, 3,3'-diaminodiphenylmethane, 3,4'-diaminodiphenylmethane, 2,2'-diaminobiphenyl, 2,4'-diaminobiphenyl, 3,3'-diaminobiphenyl, 2,4-diaminophenol, 2,5-diaminophenol, o-phenylenediamine, m-phenylenediamine, 2,3-tolylenediamine, 2,4-tolylenediamine, 2,5-tolylenediamine, 2,6-tolylenediamine and 3,4-tolylenediamine; an aliphatic polyamine such as 1,12-dodecanediamine, 1,10-decanediamine, 1,8-octanediamine, 1,14-tetradecanediamine and 1,16-hexadecanediamine; a hydrazide-based polyamine such as dodecanediohydrazide, 1,3-bis(hydrazinocarboethyl)-5-isopropylhydantoin (melting point: 121-123° C.) of the formula:

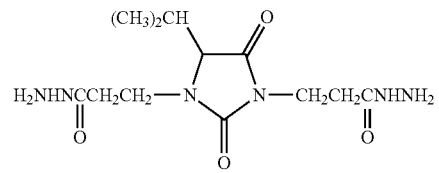

a compound (melting point: 174-181° C.) of the formula:

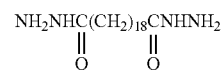

and a compound (melting point: 147-155° C.) of the formula:

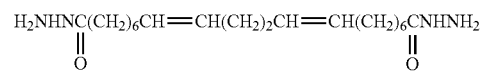

(II) A hydrolyzable reaction product obtained by a reaction of a diamine containing two amino groups or two imino groups per molecule and a carbonyl compound (aldehyde or ketone). The examples of the above-mentioned diamine include an aliphatic diamine such as dimethylaminopropylamine, diethylaminopropylamine, monomethylaminopropylamine, methyliminobispropylamine, hexamethylenediamine, 1,10-diaminododecane, ethylenediamine, propylenediamine, butylenediamine, diethylenetriamine, di-β-aminoethylsulfide, di-β-aminoethyldisulfide, di-β-aminoethylether, di-γ-amino-n-propylether, triglycoldiamine and N,N-di-iso-butyl-trimethyl-hexamethylenediamine; a cycloaliphatic diamine such as 1,8-para-menthanediamine, isoholondiamine, diaminocyclohexane, 4,4'-methylenebis (cyclohexylamine), 1,3-bisaminomethylcyclohexane, 3-aminomethyl-3,3,5-trimethylcyclohexylamine, N,N'-di-iso-butyl-isophoronediamine, N-aminoethyl-piperazine and 3-(3-aminopropyl)-3,2-dimethyl-piperazine; an aromatic compound or an araliphatic compound such as xylylene diamine, diaminodiphenylether, phenylenediamine, triaminoxylene, 4,4'-diaminodiphenylmethane, 4,4'-diaminodiphenylpropane and 4,4'-diaminodiphenylether. In particular, an aliphatic diamine having 8 or more carbon atoms is preferred.

The above-mentioned carbonyl compound generally corresponds to the formula:

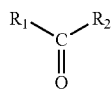

wherein $R_1$ and $R_2$ are same or different from each other and independently represent a hydrogen atom or a lower alkyl group such as a methyl group, an ethyl group, an n-propyl group, an i-propyl group, an n-butyl group, an i-butyl group and a t-butyl group, phenyl group or naphthyl group, or $R_1$ and $R_2$ together form a cyclic hydrocarbon such as cyclohexane and cyclopentane, provided that both of $R_1$ and $R_2$ do not represent a hydrogen atom or naphthyl at the same time.

The examples of the above-mentioned carbonyl compound include an aliphatic aldehyde such as acetaldehyde, propionaldehyde, n-butyraldehyde, isobutyraldehyde, diethyl acetaldehyde; an aromatic aldehyde such as benzaldehyde, a cyclic ketone such as cyclopentanone, trimethyl cyclopentanone, cyclohexanone and trimethyl cyclohexanone; an aliphatic ketone such as acetone, methyl ethyl ketone, methyl propyl ketone, methyl isopropyl ketone, methyl isobutyl ketone, diethyl ketone, dipropyl ketone, diisopropyl ketone, dibutyl ketone and diisobutyl ketone.

The above-mentioned reaction of a diamine and a carbonyl compound may be conducted in the usual condition. The reaction can be conducted, for example, using a carbonyl compound in an amount which is stoichiometrically equal to or in stoichiometrically excess of the amount of a diamine in a suitable reaction solvent such as toluene, xylene and benzene, optionally in the presence of a water absorber such as a molecular sieve and anhydrous magnesium sulfate, while dehydratation (or distillation of water) at room temperature or on heating.

In this way, the hydrolyzable reaction product can be obtained. Here, a reaction product obtained by using an aldehyde as a carbonyl compound is referred to as an "aldimine". In addition, a reaction product obtained by using a ketone as a carbonyl compound is referred to as a "ketimine".

A ketimine is more unstable than an aldimine and readily hydrolyzed. In other words, an aldimine obtained by using a relatively low molecular weight diamine is still excellent in shelf stability. However, it is desired that a ketimine is obtained by using a diamine (solid) which has a relatively high molecular weight and is stable (less active) since a ketimine obtained by using a low molecular weight diamine is poor in stability. In addition, it is more desired that the carbonyl compound is also used as a reaction medium since the reaction is always in an equilibrium state.

Preferably, the amine-based hardener (C) used in the aqueous adhesive composition according to the invention has a melting point of 60° C. or higher, preferably 80° C. or higher, more preferably 100° C. or higher. When the melting point of the amine-based hardener is lower than 60° C., the stability of the adhesive composition after coating may decrease. The upper limit of the melting point of the amine-based hardener is, preferably 250° C. or lower, more preferably 200° C. or lower, so that the heat resistance of the adhesive appears, although it is not particularly limited.

The amount of the above-mentioned amine-based hardener used is not particular limited. In the preferred embodiment, the equivalent of amino groups of the above-mentioned amine-based hardener is, for example, from 0.005 to 1 equivalent, preferably from 0.01 to 0.5 equivalent based on 1 equivalent of the carboxyl groups of the acid-modified polyolefin-based resin. When the equivalent of the amino groups of the amine-based hardener is less than 0.005, the cross-linking failure occurs and the heat resistance is impaired. When the equivalent of the amino groups of the amine-based hardener used is in large excess of the equivalent of the carboxyl groups of the acid-modified polyolefin-based resin, the storage stability decreases and the heat-resistant adhesion failure may occur.

The aqueous adhesive composition according to the invention may optionally contain an additive such as a tackifier, a viscosity modifier and a defoaming agent conventionally-known in an adhesive composition.

The examples of the above-mentioned tackifier include, but is not particular limited to, conventionally known various petroleum resins, rosin-based resins, terpene resins, coumarone-indene resins, xylene resins, phenolic resins and the modified products thereof. One kind or two or more kinds thereof may be used.

A content (solid content) of the tackifier in the aqueous adhesive composition according to the invention is, for example, preferably from 1 to 25 wt. %, more preferably from 5 to 18 wt. %, based on the whole amount of the aqueous adhesive composition, although it is not particularly limited. When the content of the tackifier is less than 1 wt. % or more than 25 wt. %, the adhesion may decrease.

The aqueous adhesive composition according to the invention can be produced by sequentially adding the above-mentioned components in a usual manner and mixing them.

The aqueous adhesive composition according to the invention is one-pack thermosetting adhesive composition, and can be used as an adhesive composition for precoating in a vacuum-molding process for an automobile interior part such as a roof lining, a door trim, an instrument panel, a dash silencer, a center console, a pillar, an ornament, a rear parcel and a seat.

For example, when a substrate made of a polyolefine and a skin material made of a polyolefine for an automobile interior part are laminated together, the aqueous adhesive composition according to the invention is firstly applied by spraying or applied with roll coater or comma coater on a surface of the skin material made of a polyolefine. Subsequently, water as a solvent is dried at room temperature or with heated air using a heating-drying apparatus and a coating of an adhesive is formed on the skin material. The skin material in which the adhesive is preliminary applied in this way is heated again and immediately bonded to the substrate made of a polyolefine.

The bonding can be carried out efficiently by means of a vacuum-molding process in which the skin material is bonded by making pores on the substrate side and conducting the vacuuming from the back side.

EXAMPLES

The Examples of the present invention will be shown below. However, the present invention is not limited thereto.

Examples 1-3 and Comparative Examples 1-3

Each component shown in Table 1 (parts by weight: if the component contains a solvent such as water, the amount of the component encompasses the amount of the solvent) was blended to produce each adhesive component. Each adhesive component obtained was evaluated as described below. The results are shown in Tables 1-3.

[Evaluation Items and Evaluation Methods]

(1) Peeling Off at Ordinary State (at the Room Temperature and 100° C. Hot)

A substrate and a skin material were laminated together by applying and drying an adhesive composition under the following conditions. After the resulting product was aged at 20° C. under 65% RH (relative humidity) for 24 hours, the peeling strength (N/25 mm) was determined at the room temperature and 100° C. hot.

(2) Heat Creep Resistance

A substrate and a skin material were laminated together by applying and drying an adhesive composition under the following conditions. The resulting product was aged at 20° C. under 65% RH (relative humidity) for 24 hours. Subsequently, the product was allowed to stand at 90° C. for 24 hours (load: 50 g, 100 g, 150 g) and after that the length (mm) of peeling was measured.

In the above-mentioned tests (1) and (2), the following evaluation was conducted.

BAF: Adhesion failure from the substrate side

CF: Cohesion failure of the adhesive

FMB: Material failure of the skin material (3) Storage Stability

The adhesive composition was allowed to stand, at 40° C. for days. After that, the change in appearance was evaluated and the above-mentioned evaluations (1) and (2) were conducted.

(4) Storage Stability After Forming a Coating

A substrate and a skin material were laminated together by applying and drying an adhesive composition under the following conditions. After that, the resulting product was aged at 70° C. for 3 days. Subsequently, the above-mentioned evaluations (1) and (2) were conducted.

[Coating Conditions]

Skin material PPF (polypropylene foam)×Substrate PP (polypropylene)

Amount of adhesive composition applied: 0.3 mm t on the PPF side

[Lamination Conditions]

Drying skin material: 195° C.×2 minutes

Heating substrate: 80° C.×3 minutes

Compression: 0.5 kgf/cm$^2$×30 seconds

TABLE 1

|  | Example 1 | Example 2 | Example 3 | Comparative Example 1 | Comparative Example 2 | Comparative Example 3 |
|---|---|---|---|---|---|---|
| (A1) acid-modified polypropylene (m.p. 100° C.) | 15 |  | 15 | 15 | 15 | 15 |
| (A2) acid-modified polypropylene (m.p. 125° C.) | 35 | 35 | 35 | 35 | 35 | 35 |
| (A3) acid-modified polypropylene (m.p. 80° C.) |  | 15 |  |  |  |  |
| (B) core-shell hardener | 4 | 4 | 4 |  |  |  |
| (C) amine-based hardener | 0.1625 | 0.1625 |  | 0.1625 | 1.6250 |  |
| (D) tackifier | 22.5 | 22.5 | 22.5 | 22.5 | 22.5 | 22.5 |
| (E) acrylic emulsion |  |  |  | 4 | 4 |  |
| total | 76.66 | 76.66 | 76.50 | 76.66 | 76.83 | 72.50 |
| Peeling off test at the room temperature (N/25 mm) | 62.1 FMB/BAF | 52.7 FMB/BAF | 62.4 FMB/BAF | 57.0 FMB/BAF | 63.0 FMB/BAF | 65.5 FMB/BAF |
| Peeling off test at 100° C. hot (N/25 mm) | 14.4 BAF | 17.3 BAF | 10.4 BAF | 13.2 BAF | 14.8 BAF | 4.5 BAF |
| 90° C. Heat creep resistance (mm) load 50 g | 0 | 0 | 0 | 0 | 0 | 2 CF/BAF |
| load 100 g | 0 | 0 | 0 | 0 | 0 | 20 BAF |
| load 150 g | 0 | 0 | 0 | 0 | 0 | 40 BAF |

Each compound in Table 1 is as follows:

(A1) acid-modified polypropylene: NA-1001 from Toyo Kasei Kogyo Co., Ltd. (m.p. 100° C., acid-modification rate: 3%, solid content: 30%)

(A2) acid-modified polypropylene: NA-3003 from Toyo Kasei Kogyo Co., Ltd. (m.p. 125° C., acid-modification rate: 2.5%, solid content: 30%)

(A3) acid-modified polypropylene: NZ-1001 from Toyo Kasei Kogyo Co., Ltd. (m.p. 80° C., acid-modification rate: 2.2%, solid content: 30%)

(B) core-shell hardener: Polytron R-1000 from Asahi Kasei Chemicals Co., Ltd. (Tg of shell part: -15° C., core/shell weight ratio: 40/30, solid content: 50%)

(C) amine-based hardener: dodecanedihydrazide (m.p. 190° C.)

(D) tackifier: QME-120 from Toho Chemical Industry Co., Ltd. (petroleum resin emulsion, solid content: 50%)

(E) acrylic emulsion: Polytron T-155 from Asahi Kasei Chemicals Co., Ltd.

TABLE 2

Storage stability (40° C. × 10 days)

| | Example 1 | Example 2 | Example 3 | Comparative Example 1 | Comparative Example 2 | Comparative Example 3 |
|---|---|---|---|---|---|---|
| Peeling off test at the room temperature (N/25 mm) | 61.2 FMB/BAF | 55.1 FMB/BAF | 60.1 FMB/BAF | 60.2 BAF/FMB | 45.3 BAF/FMB | 58.0 FMB/BAF |
| Peeling off test at 100° C. hot (N/25 mm) | 12.2 BAF | 20.2 BAF | 13.7 BAF | 9.5 BAF/CF | 10.0 BAF/CF | 3.5 BAF |
| 90° C. Heat creep resistance (mm) load 50 g | 0 | 0 | 0 | 0 | 0 | 2 CF/BAF |
| load 100 g | 0 | 0 | 0 | 0 | 0 | 20 BAF |
| load 150 g | 0 | 0 | 0 | fall BAF | 0 | 40 BAF |
| Appearance and characteristics | no change | no change | no change | no change | viscocity increase | no change |

TABLE 3

Storage stability (70° C. × 3 days)

| | Example 1 | Example 2 | Example 3 | Comparative Example 1 | Comparative Example 2 | Comparative Example 3 |
|---|---|---|---|---|---|---|
| room temperature peeling off test (N/25 mm) | 60.8 FMB/BAF | 57.3 FMB/BAF | 62.4 BAF/FMB | 38.9 BAF/FMB | 26.5 BAF | 65.5 FMB/BAF |
| 100° C. hot peeling off test (N/25 mm) | 15.5 BAF | 16.3 BAF | 9.7 BAF/FMB | 8.5 FMB/BAF | 3.0 BAF | 4.5 BAF |
| 90° C. Heat creep resistance (mm) load 50 g | 0 | 0 | 0 | 0 | 0 | 2 CF/BAF |
| load 100 g | 0 | 0 | 0 | 0 | fall BAF | 20 BAF |
| load 150 g | 0 | 0 | 0 | fall BAF | fall BAF | 40 BAF |

As shown in Tables 1-3, it is apparent that the adhesive compositions of Examples 1-3 have excellent performance in the storage stability, the stability after forming an adhesive coating and the heat creep resistance as a precoat adhesive. In the hot peeling off test, it is recognized that the peeling strength is increased by adding the amine-based hardener (C). It is recognized that the adhesive compositions of Comparative Examples 1-3 do not have the sufficient heat creep resistance when the core-shell hardener (B) is not added and that the stability of adhesive and the adhesion after forming a coating are decreased when the heat creep resistance is ensured by adding only the amine-based hardener (C) in excess.

The invention claimed is:

1. An aqueous adhesive composition, comprising:
(A) an acid-modified polyolefin-based resin,
(B) a core-shell hardener having a shell consisting of an acrylic copolymer having a glass transition temperature of −30° C. to 100° C. and a core consisting of an epoxy group-containing resin compound or a monomer thereof capable of cross-linking to the acid-modified polyolefin-based resin, and
(C) an amine-based hardener having a melting point of 60° C. or higher, in an amount such that 0.005-1 equivalent groups are present based on 1 equivalent of carboxyl groups in the acid-modified polyolefin-based resin, and selected from at least one of the group consisting of 4,4'-diaminodiphenylmethane, 2,4'-diaminodiphenylmethane, 3,3'-diaminodiphenylmethane, 3,4'-diaminodiphenylmethane, 2,2'-diaminobiphenyl, 2,4'-diaminobiphenyl, 3,3'-diaminobiphenyl, 2,4-diaminophenol, 2,5-diaminophenol, o-phenylenediamine, m-phenylenediamine, 2,3-tolyenediamine, 2,4-tolyenediamine, 2,5-tolyenediamine, 2,6-tolyenediamine, 3,4-tolyenediamine, 1,12-dodecanediamine, 1,10-decanediamine, 1,8-octanediamine, 1,14-tetradecanediamine, 1,16-hexadecanediamine, dodecanediohydrazide, 1,3-bis(hydrazinocarboethyl)-5-isopropylhydantoin having melting point 121-123° C. of the formula

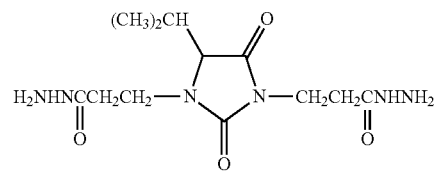

a compound having melting point 174-181° C. of the formula

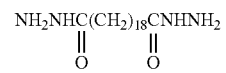

and a compound having melting point 147-155° C. of the formula

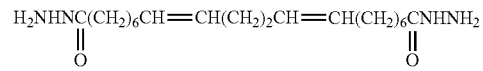

wherein the aqueous adhesive composition does not omit any solvent gas when applying or drying.

2. The aqueous adhesive composition according to claim 1, wherein a weight ratio of the core and the shell in the core-shell hardener (B) is from 10:90 to 90:10.

3. The aqueous adhesive composition according to claim 1, for an automobile interior part.

4. The aqueous adhesive composition according to claim 1, for a precoat adhesive.

5. An aqueous adhesive composition, comprising:
(A) an acid-modified polyolefin-based resin,
(B) a core-shell hardener having a shell consisting of an acrylic copolymer having a glass transition temperature of −30° C. to 100° C. and a core consisting of an epoxy group-containing resin compound or a monomer thereof capable of cross-linking to the acid-modified polyolefin-based resin, and (ii) enabling use of the aqueous adhesive composition in a vacumm molding process, and
(C) an amine-based hardener having a melting point of 60° C. or higher, in an amount such that 0.005-1 equivalent groups are present based on 1 equivalent of carboxyl groups in the acid-modified polyolefin based resin, and selected from at least one of the group consisting of 4,4'-diaminodiphenylmethane, 2,4'-diaminodiphenylmethane, 3,3'-diaminodiphenylmethane, 3,4'-diaminodiphenylmethane, 2,2'-diaminobiphenyl, 2,4'-diaminobiphenyl, 3,3'-diaminobiphenyl, 2,4-diaminophenol, 2,5-diaminophenol, o-phenylenediamine, m-phenylenediamine, 2,3-tolylenediamine, 2,4-tolylenediamine, 2,5-tolylenediamine, 2,6-tolylenediamine, 3,4-tolylenediamine, 1,12-dodecanediamine, 1,10-decanediamine, 1,8-octanediamine, 1,14-tetradecanediamine, 1,16-hexadecanediamine, dodecanediohydrazide, 1,3-bis(hydrazinocarboethyl)-5-isopropylhydantoin having melting point 121-123° C. of the formula

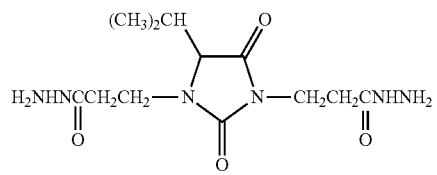

a compound having melting point 174-181° C. of the formula

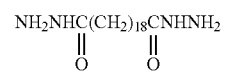

and a compound having melting point 147-155° C. of the formula

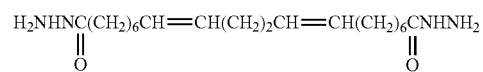

wherein the aqueous adhesive composition does not omit any solvent gas when applying or drying.

* * * * *